United States Patent [19]
Feit et al.

[11] Patent Number: 5,430,791
[45] Date of Patent: Jul. 4, 1995

[54] TECHNIQUE FOR ADMINISTERING PERSONAL TELEPHONE NUMBERS

[75] Inventors: Susan Feit, Manalapan; Leon H. Gellman, Long Branch; Peter Kapsales, Middletown; Wayne D. Phillips, Alpharetta; Patricia D. Saleh, Holmdel; Barry S. Seip, New Providence, all of N.J.

[73] Assignee: AT&T Corp., Murray Hill, N.J.

[21] Appl. No.: 23,223

[22] Filed: Feb. 26, 1993

[51] Int. Cl.⁶ ............................................. H04M 3/42
[52] U.S. Cl. .................................... 379/67; 379/216; 379/201; 379/265; 379/211
[58] Field of Search ................ 379/67, 355, 216, 211, 379/381, 201, 265

[56] References Cited

U.S. PATENT DOCUMENTS

| | | | |
|---|---|---|---|
| 4,313,035 | 1/1982 | Jordan et al. | 379/211 |
| 4,899,358 | 2/1990 | Blakley | 379/67 |
| 5,012,511 | 4/1991 | Hanle et al. | 379/201 |
| 5,018,191 | 5/1991 | Catron et al. | 379/211 |
| 5,199,062 | 3/1993 | Von Meister et al. | 379/211 |
| 5,239,577 | 8/1993 | Bates et al. | 379/211 |
| 5,311,572 | 5/1994 | Friedes et al. | 379/211 |
| 5,329,578 | 7/1994 | Brennan et al. | 379/211 |

*Primary Examiner*—James L. Dwyer
*Assistant Examiner*—Scott Wolinsky
*Attorney, Agent, or Firm*—Eugene J. Rosenthal; Barry H. Freedman

[57] ABSTRACT

A method of administering a sequence of locations to which calls placed to a subscriber's personal telephone number may be routed for personal communication service by a) storing pre-defined mnemonic audible tags for association with telephone numbers prior to any interactions with the subscriber, b) offering the subscriber a choice of the pre-defined mnemonic audible tags by speaking them to him, c) receiving an indication of the mnemonic audible tag selected by the subscriber, d) receiving signals indicating a telephone number supplied by the subscriber and e) storing the received telephone number information in association with the selected mnemonic audible tag. The mnemonic audible tags are then used in place of their respective associated telephone numbers in administering the sequence of locations. A mnemonic audible tag is a meaningful word indicative of the actual location, person, or service, e.g., "office", "neighbor" or "AT&T voicemail", to which a call to the personal telephone number is to be completed. Advantageously, administering a sequence of locations is accomplished by simply manipulating friendly, meaningful and easy to understand terms rather than cumbersome and meaningless, telephone numbers or codes.

16 Claims, 5 Drawing Sheets

TECHNIQUE FOR ADMINISTERING PERSONAL TELEPHONE NUMBERS

TECHNICAL FIELD

This invention relates to personal communications, and more particularly, to administering a series of telephone numbers corresponding to destinations to which incoming calls to a person's personal telephone number should be routed to at a particular time.

BACKGROUND OF THE INVENTION

Personal communication service (PCS) is a service in which subscribers, rather than locations or telephone stations, are assigned a personal telephone number. Calls placed to a subscriber's personal telephone number are routed to the subscriber at a telephone near that subscriber's current location. In order to provide a subscriber with such a personal communication service, e.g., as disclosed in U.S. Pat. No. 4,313,035, issued to Jordan, et al., the system providing the service (PCS system) must be supplied with the telephone number of a telephone near the subscriber's current location to which it should route calls to his personal telephone number. Each time the subscriber changes his location, the telephone number to which calls placed to his personal telephone number are routed must be changed. This requires the subscriber to call into the PCS system and to supply the telephone number to which his calls should currently be routed. Constantly having to call in to the PCS system can be tiresome, and supplying a ten-digit telephone number each time a subscriber changes his location is cumbersome.

To overcome these drawbacks, one prior art solution is to program a scheduled sequence of telephone numbers at which the personal telephone service subscriber can be reached over a period of time. When a call is made to the subscriber, the PCS system picks the specific number in the sequence that is appropriate for the call and routes the call to that destination. In order to administer the sequence, the subscriber places a call to a live attendant. The live attendant collects the telephone numbers to which calls to the subscriber's personal telephone number should be routed, along with the corresponding time schedule, and enters this information into the PCS system by way of a computer-like terminal. This solution suffers from the disadvantages of being costly and of discouraging the owner of the personal telephone number from calling, because the interaction with the live attendant takes a relatively large amount of time.

Another prior art approach is to straightforwardly automate the functions of the live attendant. However, doing so requires a person who is administering a personal telephone number to supply, receive, and keep track of an unwieldy quantity of telephone numbers, each being, typically, a minimum of ten-digits in length. Such an implementation often results in confusion and is difficult to use. Even if shortened codes are assigned to each telephone number, the subscriber tends to quickly lose track of the telephone numbers assigned to each code, and hence loses the meaning of the code.

SUMMARY OF THE INVENTION

The drawbacks to administering a sequence of locations to which calls placed to a subscriber's personal telephone number may be routed for personal communication service, are overcome, in accordance with the principles of the invention, by a) storing pre-defined mnemonic audible tags for association with telephone numbers prior to any interactions with the subscriber, b) offering the subscriber a choice of the pre-defined mnemonic audible tags by speaking them to him, c) receiving an indication of the mnemonic audible tag selected by the subscriber, d) receiving signals indicating a telephone number supplied by the subscriber; and e) storing the received telephone number information in association with the selected mnemonic audible tag. The mnemonic audible tags are then used in place of their respective associated telephone numbers in administering the sequence of locations. A mnemonic audible tag is not simply an ordering designation—such as 1, 2, 3, ... , N; first number, second number, third number, ... , Nth number; A, B, C, ... —but instead is a meaningful word indicative of the actual location, person, or service, e.g., "office", "neighbor" or "AT&T voicemail", to which a call to the personal telephone number is to be completed. Advantageously, administering a sequence of locations is accomplished by simply manipulating friendly, meaningful, easy to understand terms rather than cumbersome, meaningless, telephone numbers or codes.

In one embodiment of the invention, each mnemonic audible tag has a corresponding identifier, e.g., a 2-digit code, and the association is created among the telephone number, the mnemonic audible tag and its corresponding identifier. Use of such an identifier along with a mnemonic audible tag can further speed the administering process.

DETAILED DESCRIPTION

Figure 1:
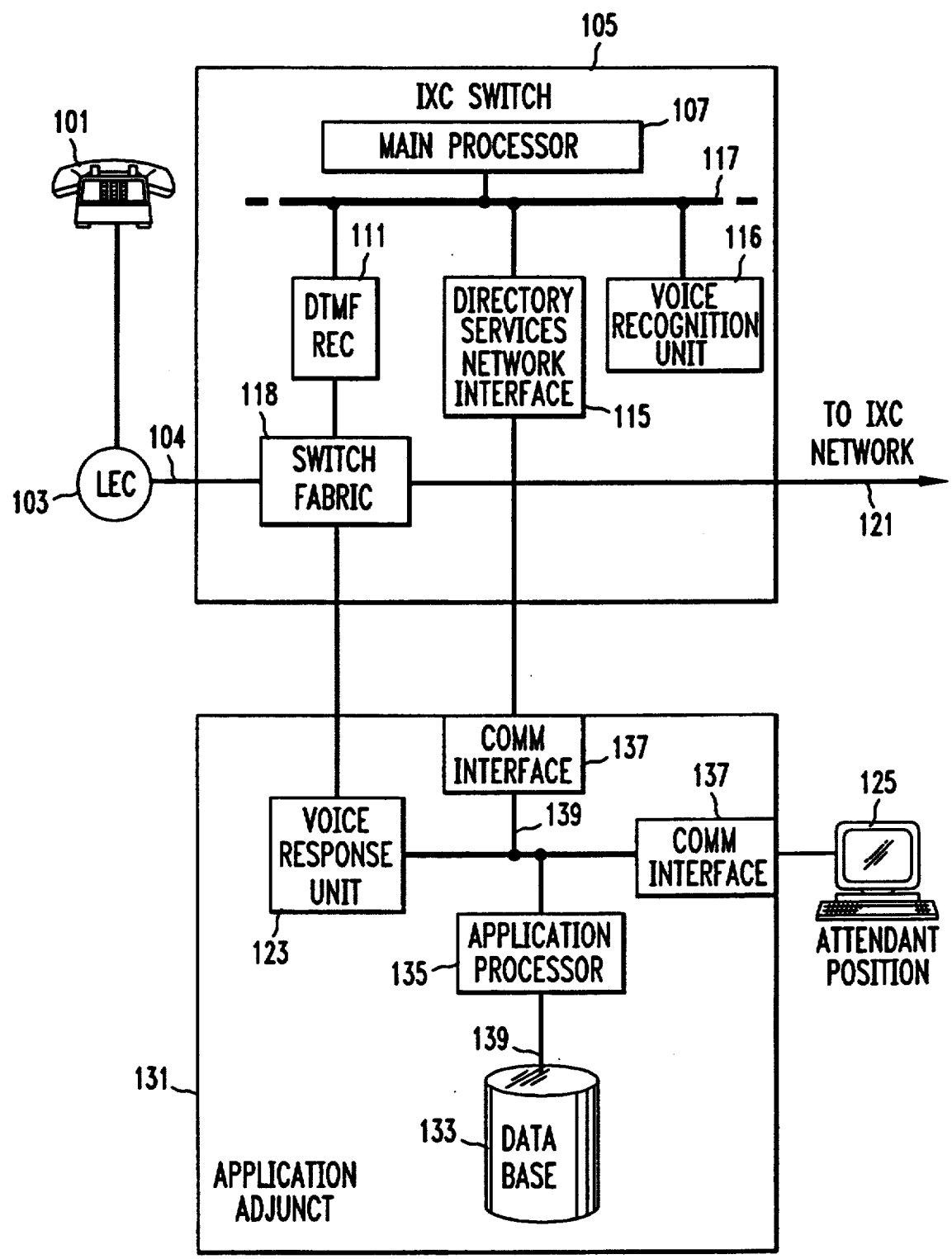
FIG. 1 shows an exemplary embodiment of a system for providing personal communications services in accordance with the principles of the invention.

Understanding of the invention will be helped by first considering an example of the administration of a personal telephone number. The example, which is divided into three separate listings, listing 1, listing 2 and listing 3, shows a) how the pre-defined mnemonic audible tags—hereinafter, "tags"—are associated with a telephone number and b) how the tags are used to define a sequence of locations to which calls to a subscriber's personal telephone number should be routed at a particular time. Each of the listings shows an exemplary part of the interactions between a hypothetical subscriber and an automated attendant system that facilitates the administration of personal telephone numbers. Listing 1 shows the creation of associations between tags and telephone numbers, in accordance with the principles of the invention. Listing 2 shows the defining of a sequence of locations to which the calls to a subscriber's personal telephone number should be routed. Such a sequence of locations is called a "quick sequence". Listing 3 shows the designating of the sequence defined in listing 2 as the sequence that is to currently be used, thereby "activating" the quick sequence.

The listings show that portion of the interaction after the hypothetical subscriber places a call to an 800-type telephone number to connect to the automated attendant and after he has successfully completed any required login procedures to begin administering his personal telephone number. In each of the listings, boldface type shows that which the automated attendant says to the hypothetical subscriber. The actions taken by the caller are described in plain type. Explanatory comments as to the results caused by the subscriber's actions are shown in parenthesis. Also, in this example, the identifier corresponding to each tag is a one digit number.

Listing 1—Associating a telephone number to a tag
To manage your call screening PINs, press 1.
To manage your tags, press 2.
To manage your quick sequences, press 3.

subscriber presses 2.

To choose a new tag press 1, to delete a tag press 2, to hear your existing tags press 3.

subscriber presses 1.

Enter the tag code from your user guide, or enter 0 to hear the list of tags.

subscriber presses 0.

To select a tag and to enter a telephone number, enter the tag number.
**To quit what you are doing and return to the main menu press *R.**

Home, press 1.
Office, press 2.
Secretary, press 3.
Car Phone, press 4.

subscriber presses 4.

You have selected car phone. Please enter a 10 digit telephone number, that is, enter the area code plus the number for car.

subscriber enters 5557773333

Tag 4 is car phone, telephone number is 555-777-3333.
To approve this tag press 1.
To approve this tag and add another press 2.
To redo this tag press 3.
**To quit what you are doing and return to the main menu press *R.**

subscriber presses 2.

To select a tag and to enter a telephone number, enter the tag number.
**To quit what you are doing and return to the main menu press *R.**

Home, press 1.
Office, press 2.

subscriber presses 2.

You have selected office. Please enter a 10 digit telephone number, that is, enter the area code plus the number for office.

subscriber enters 5554442222
Tag 2 is office, telephone number is 555-444-2222.
To approve this tag press 1.
To approve this tag and add another press 2.
To redo this tag press 3.
**To quit what you are doing and return to the main menu press *R.**

subscriber presses 1. (returns subscriber to main menu)
Listing 2—Storing rags in a quick sequence
To manage your call screening PINs, press 1.
To manage your tags, press 2.
To manage your quick sequences, press 3.

subscriber presses 3.

To add a quick sequence, press 1.
To delete a quick sequence, press 2.
To hear your quick sequences, press 3.

subscriber presses 1.

Enter the quick sequence number. Please enter a number from one to nine.

subscriber presses 1. (the quick sequence will be stored as quick sequence number 1).

Where is the first place calls should be delivered?
(the following listed items are those tags that have a phone number associated with them. Tags without a phone number are not listed).

Home, press 1.
Office, press 2.
Car Phone, press 4.
Neighbor, press 13.
Mother, press 14.
Brother, press 20.
Summer Home, press 33.

subscriber presses 4. (Car Phone becomes the first destination in the quick sequence)

You have selected car phone as the first place calls should be delivered.
Where is the second place calls should be delivered?
Press # to end this sequence.

Home, press 1.
Office, press 2.
Car Phone, press 4.
Neighbor, press 13.
Mother, press 14.
Brother, press 20.
Summer Home, press 33.

subscriber presses 2. (Office becomes the second destination in the quick sequence)

You have selected office as the second place calls should be delivered.
Where is the third place calls should be delivered?
Press # to end this sequence.

subscriber presses #. (Ends the quick sequence)

Quick sequence 1 is car phone and then office.
To approve this quick sequence press 1.
To approve this quick sequence and add another press 2.
To redo this quick sequence press 3.
To quit what you are doing and return to the main menu press *R.

subscriber presses 1. (returns to the main menu)
Listing 3—Activating a quick sequence
To get voice mail, press 1
To turn a quick sequence or quick follow me destination on or off, press 2.
To change your call delivery schedules, press 3.
To administer your lists and system settings, press 4.
To hear where your calls are going, press 5.
To get help, press *H.

subscriber presses 2.

Enter the quick sequence number or enter 0 to hear your list of quick sequences. To use quick follow me press #.

subscriber presses 1.

Starting immediately your calls will be delivered to car phone and then to office. This quick sequence will stay in effect until you turn it off.
To accept this quick sequence, press 1. Otherwise press 0.

subscriber presses 1.

Thank you.

Attention is now directed to systems and methods by which the administration of a personal telephone number, as shown in listings 1–3, may be achieved. FIG. 1 shows an exemplary embodiment of a system for providing personal communications services in accordance with the principles of the invention. In the embodiment of FIG. 1, the information creating the associations between telephone numbers, tags and their corresponding identifiers used with the interface for administering personal telephone numbers is stored in a data base located within the telephone network of the carrier completing the call, e.g., in the network of an interexchange carrier (IXC). Shown are a) telephone station 101, from which calls to a personal telephone number may be originated, b) local exchange carrier (LEC) 103, c) IXC switch 105, d) application adjunct 131, and e) attendant position 125.

Application adjunct 131 performs the necessary processing for 1) storing an association between a telephone number and a pre-defined audible tag and its corresponding identifier, 2) developing quick sequences, and 3) supplying the telephone number of a destination to which IXC switch 105 should route a call placed to a subscriber's personal telephone number. Application adjunct 131 includes: a) application processor 135, b) data base 133, c) voice response unit 123, and d) communication interfaces 137. Application processor 135 controls the overall operation of application adjunct 131 by performing any necessary processing and exchanging messages with the other components of application adjunct 131 over links 139. Links 139 convey information in digital form and need not all be of the same type or speed, e.g., one may be an ethernet link while the others are RS-232C links. Data base 133 stores the information required by application processor 135 to control application adjunct 131, e.g., program code and data.

Voice response unit 123 can make various announcements which can be heard by the calling party. The information necessary for making the announcement announcements, or combinative portions thereof, may be prestored in voice response unit 123. Such combinative portions include the pre-defined mnemonic audible tags. In one embodiment, the announcements are accessed by supplying voice response unit 123 with pointers to them. In another embodiment, the information for the pre-defined mnemonic audible tags is stored in data base 133. In either case, the information for the pre-defined mnemonic audible tags is stored prior to any interactions with the subscriber taking place. Voice response unit 123 is connected to switch fabric 118 so that the announcements may be routed to subscribers who call into application adjunct 131.

Communication interfaces 137 translate information for communication between application adjunct 131 and devices external to application adjunct 131. Communication interfaces 137 need not be the same. Attendant position 125, staffed by a human attendant, interfaces with application adjunct 131 to handle any questions that a subscriber may have or any problems that may arise.

IXC switch 105 includes: a) main processor 107, b) dual tone multi-frequency receiver (DTMF REC) 111, c) directory services network interface 115, d) bus 117, e) switch fabric 118, and f) optional voice recognition unit 116. Main processor 107 controls the overall operation of IXC switch 105 by performing any necessary processing and exchanging messages with the other components of IXC switch 105 over bus 117. Dual tone multi-frequency receiver (DTMF REC) 111 receives dual tone multi-frequency signals that are transmitted in response to the pressing of keys on the keypad of telephone station 101 and supplies the digit corresponding to each pressed key to main processor 107.

Directory services network interface 115 is a protocol conversion unit that permits IXC switch 105 to communicate with application adjunct 131. It is responsible for formatting all messages transmitted to and for extracting responses received from application adjunct 131. In one embodiment, the link between directory services network interface 115 and application adjunct 131 uses the well known X.25 protocol.

Switch fabric 118 can connect the trunk on which the subscriber's call arrived at IXC switch 105, e.g., trunk 104, to a) dual tone multi-frequency receiver (DTMF REC) 111, b) voice recognition unit 116, c) voice response unit 123 or d) to the rest of the interexchange carrier's network, via link 121. The purposes of such connections are described further below.

A subscriber at telephone station 101 (FIG. 1) may signal that he wishes to administer his personal telephone number by placing a call to an 800-type number specified by the interexchange carrier. LEC 103 recognizes from the particular 800-type number dialed by the subscriber that the call is to be carried by a particular IXC and, therefore, it forwards the call to switch 105 of that IXC. IXC switch 105 recognizes that the particular 800-type number that was dialed is for a call that must be processed by application adjunct 131 and so it transmits a message containing the dialed number to application adjunct 131. Application adjunct 131 recognizes that the dialed number is the telephone number indicating administration of personal telephone numbers is desired and it, therefore, begins a session to administer a personal telephone number. The session begins with a login sequence by which the subscriber identifies himself to application adjunct 131.

By pressing keys at telephone station 101, the subscriber supplies his responses to the prompts he hears in the form of dual tone multi-frequency (DTMF) signals. To receive and decode the dual tone multi-frequency (DTMF) signals supplied by the subscriber, dual tone multi-frequency receiver (DTMF REC) 111 is connected to the subscriber's call, via switch fabric 118. Messages corresponding to the decoded received signals are transmitted to application adjunct 131 via directory services network interface 115. In an alternative embodiment, the subscriber could supply his responses to the prompts in the form of speech which is received and decoded by voice recognition unit 116.

Figure 2:
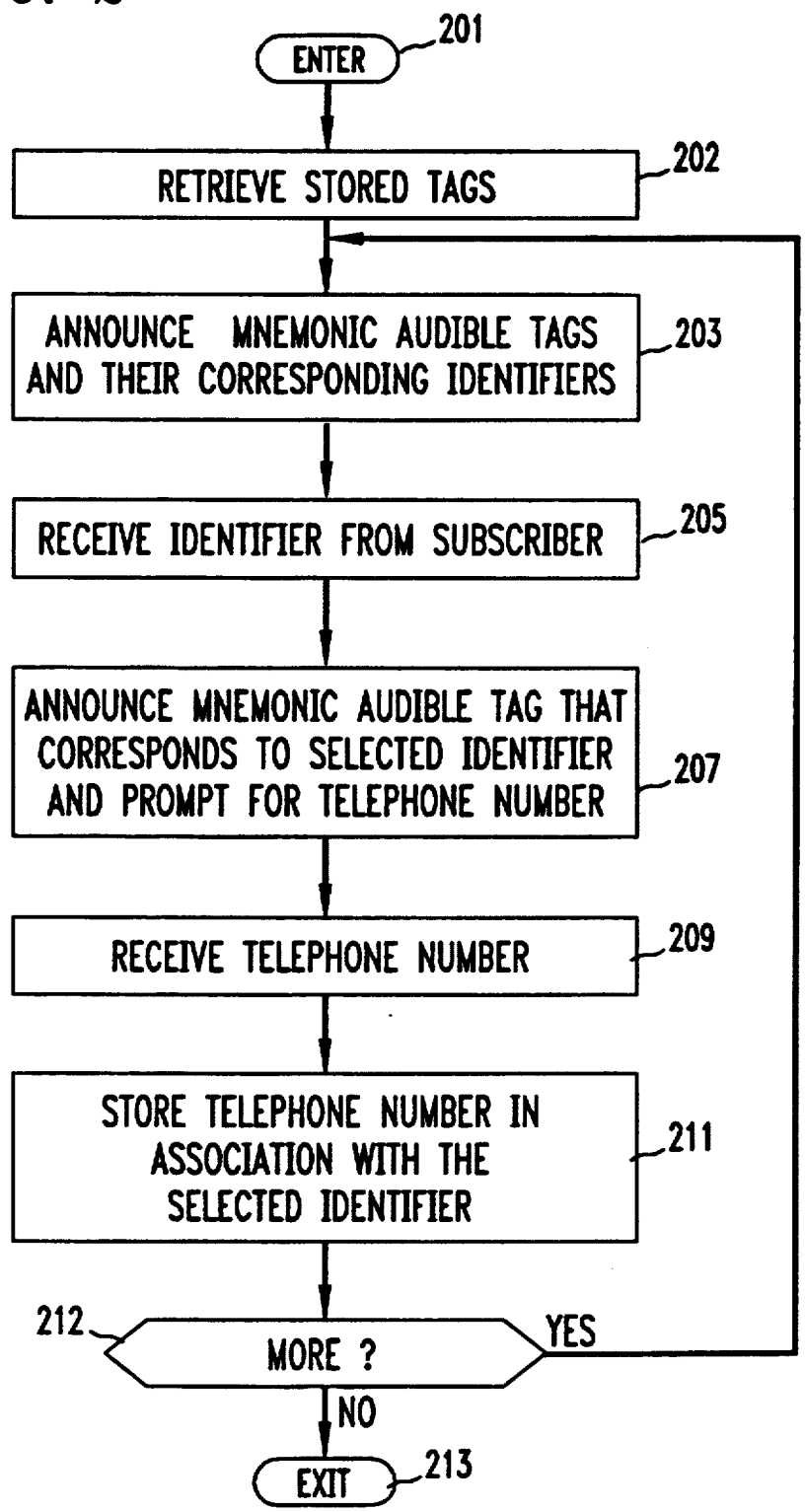
FIG. 2 shows a flow chart of an exemplary process performed in the system of FIG. 1 for obtaining and storing the information necessary to establish an association between a telephone number and a mnemonic audible tag, in accordance with the principles of the invention.

FIG. 2 shows a flow chart of an exemplary process performed in the system of FIG. 1 for obtaining and storing the information necessary to establish an association between a telephone number and a mnemonic audible tag, in accordance with the principles of the invention. The process begins in step 201 when a subscriber calls in to administer the routing plan for his personal telephone number and indicates that he wishes to create a new association. Next, in step 202, the list of available pre-defined audible tags and their corresponding identifiers are retrieved and, in step 203, the tags are offered to the subscriber by being spoken to him by voice response unit 123 for his selection under control of adjunct processor 131, in accordance with the principles of the invention. The pre-defined mnemonic audible tags for association with telephone numbers are stored prior to any interactions with the subscriber taking place, i.e., prior to step 201. It is noted that the so-called "dial-ahead" feature is available so that the subscriber may enter the identifier of the tag he desires at any point, if he knows it, even if it has not yet been spoken.

Table 1 shows an exemplary written list of pre-defined, audible tags and their corresponding identifiers. In this embodiment, Table 1 is stored in data base 133. Table 1 may be implemented as an array in which the tags are the elements of the array and the identifiers are the corresponding indices into the array. Text-to-speech conversion may be used to speak the tags or, alternatively, there may also be stored pointers to information representing stored speech for each tag. The information representing speech may be stored in voice response unit 123, as noted, and, if so, it was stored there prior to the processing of any calls to administer subscriber numbers.

TABLE 1

| Audible Tag | Identifier |
| --- | --- |
| Home | 01 |
| Office | 02 |
| Secretary | 03 |
| Car Phone | 04 |
| Wife | 05 |
| Husband | 06 |
| AT & T Voice Mail | 07 |
| AT & T Voice Mail with Pager | 08 |
| AT & T Pager | 09 |
| Spouse | 10 |
| Roommate | 11 |
| Children | 12 |
| Neighbor | 13 |
| Mother | 14 |
| Father | 15 |
| Parents | 16 |

In step 205, application adjunct 131 receives a signal indicating the identifier selected by the subscriber. Next, in step 207, the mnemonic audible tag that corresponds to the selected identifier is announced to the subscriber and the subscriber is prompted to supply the telephone number to be associated with the selected mnemonic audible tag. The telephone number entered by the subscriber is received by application adjunct 131, in step 209. Thereafter, in step 211, the received telephone number is stored in data base 133 in association with the selected identifier, in accordance with the principles of the invention. Table 2 shows an exemplary table in which identifiers are associated with telephone numbers. In one exemplary embodiment, the telephone numbers are stored in data base 133 as elements of an array, one array for each subscriber, and the identifiers are the corresponding indices into the array. The array may be stored in a compressed from.

Conditional branch point 212 tests to determine if the subscriber wishes to store more telephone numbers in association with tags. If the test result in step 12 is YES, control passes to back to step 203. If the test result in step 212 is NO, control passes to step 213 and the process is exited.

TABLE 2

| Identifier | Telephone # |
| --- | --- |
| 01 | 5559742211 |
| 02 | 5559497777 |
| 03 | 5559492211 |
| 04 | 5554152219 |
| 05 | |
| 06 | |
| 07 | 8005558100 |
| 08 | 8005554444 |
| 09 | 8005552312 |
| 10 | |
| 11 | |
| 12 | 2213861599 |
| 13 | |
| 14 | 8334429181 |
| 15 | |
| 16 | |

Figure 3:
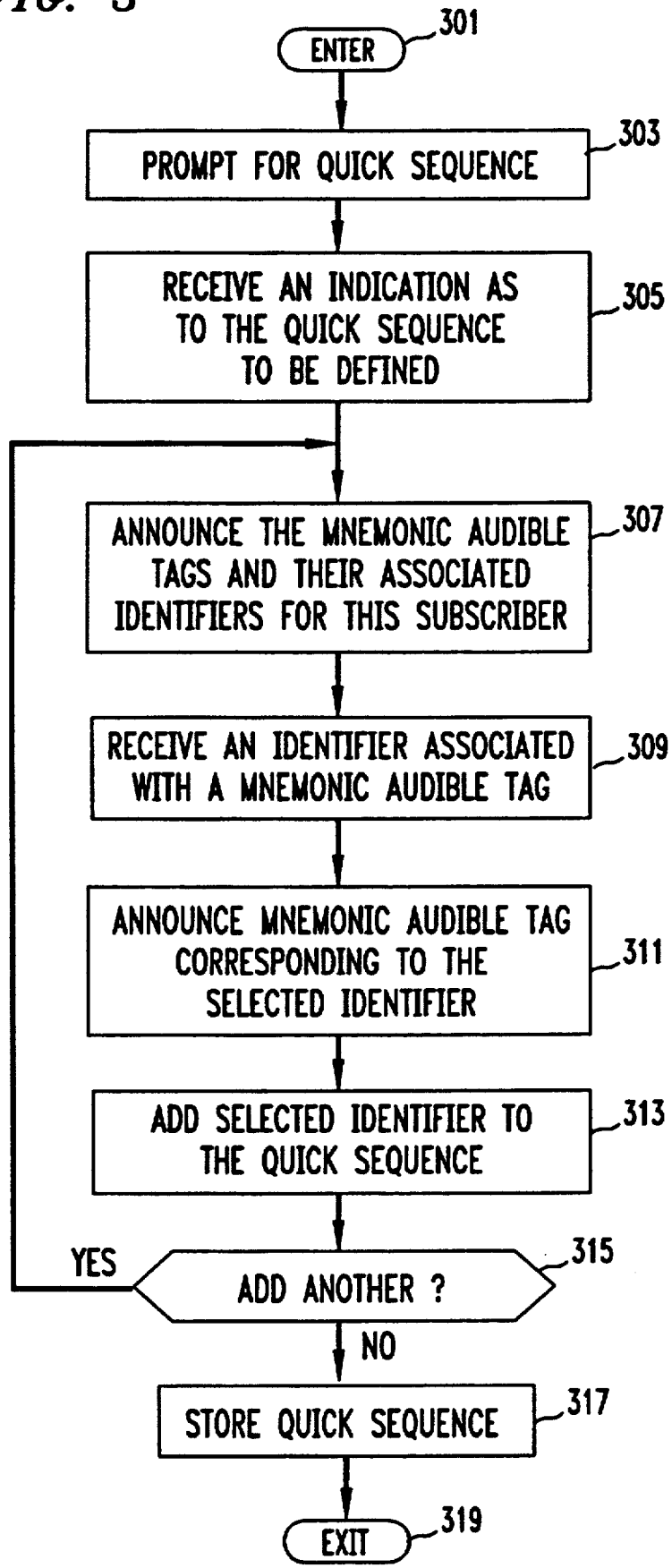
FIG. 3 shows an exemplary process performed in the system of FIG. 1 for using the stored association between a mnemonic audible tag and a telephone number, established using the process of FIG. 2, to create a sequence of locations to which the calls to a subscriber's personal telephone number should be routed, in accordance with the principles of the invention.

FIG. 3 shows an exemplary process performed in the system of FIG. 1 for using the stored association between a mnemonic audible tag and a telephone number, established using the process of FIG. 2, to create a sequence of locations to which the calls to a subscriber's personal telephone number should be routed, in accordance with the principles of the invention. Again, such a sequence of destinations is known as "quick sequence". The process is entered in step 301 when the subscriber indicates that he wishes to define a quick sequence. Each of a subscriber's quick sequences has a quick sequence number which is a unique numerical designation. In step 303, the subscriber is prompted to supply a quick sequence number indicating which quick sequence is to be defined. Next, in step 305, application adjunct 131 receives a signal indicating the number of the quick sequence to be defined.

Thereafter, in step 307, each mnemonic audible tag, and its corresponding identifier, for which the subscriber has created an association to a telephone number, is announced to the subscriber, in accordance with the principles of the invention. An identifier corresponding to a mnemonic audible tag is received from the subscriber in step 309. In step 311, the mnemonic audible tag corresponding to the selected identifier is announced to the subscriber, in accordance with the principles of the invention, for confirmation purposes. The selected identifier is added to the quick sequence in the next available position thereof, in step 313.

Conditional branch point 313 tests to determine if another location is to be added to the quick sequence. If the test result in step 315 is YES, control passes back to step 307. If the test result in step 315 is NO, control passes to step 317 in which the quick sequence is stored. The process then exits in step 319.

Table 3 shows an exemplary set of quick sequences, QS1 to QS9, each having at most 3 possible telephone numbers to which they can attempt to route a call. Each telephone number is represented by the identifier (ID) corresponding to a tag which has been associated with that telephone number, in accordance with the principles of the invention. Of course, other quick sequences can have more than at most 3 possible telephone numbers and, as shown in table 3, each quick sequence need not have the same number of telephone numbers indicated therein.

TABLE 3

| Routing | Quick Sequence Routings | | |
|---------|------|------|------|
|  | ID 1 | ID 2 | ID 3 |
| QS1 | 02 | 01 | 04 |
| QS2 | 01 |  |  |
| QS3 | 01 | 02 | 03 |
| QS4 | 14 | 04 | 12 |
| QS5 | 04 | 02 | 01 |
| QS6 | 02 | 03 |  |
| QS7 |  |  |  |
| QS8 | 04 | 02 |  |
| QS9 |  |  |  |

In another embodiment of the invention, tags are also assigned for the quick sequences themselves, instead of or in addition to the numerical designation. Tags for use with quick sequences are, for example, day, night, lunch, going home, going work, Saturday, Sunday, weekend, summer, winter, and holiday.

Figure 5:
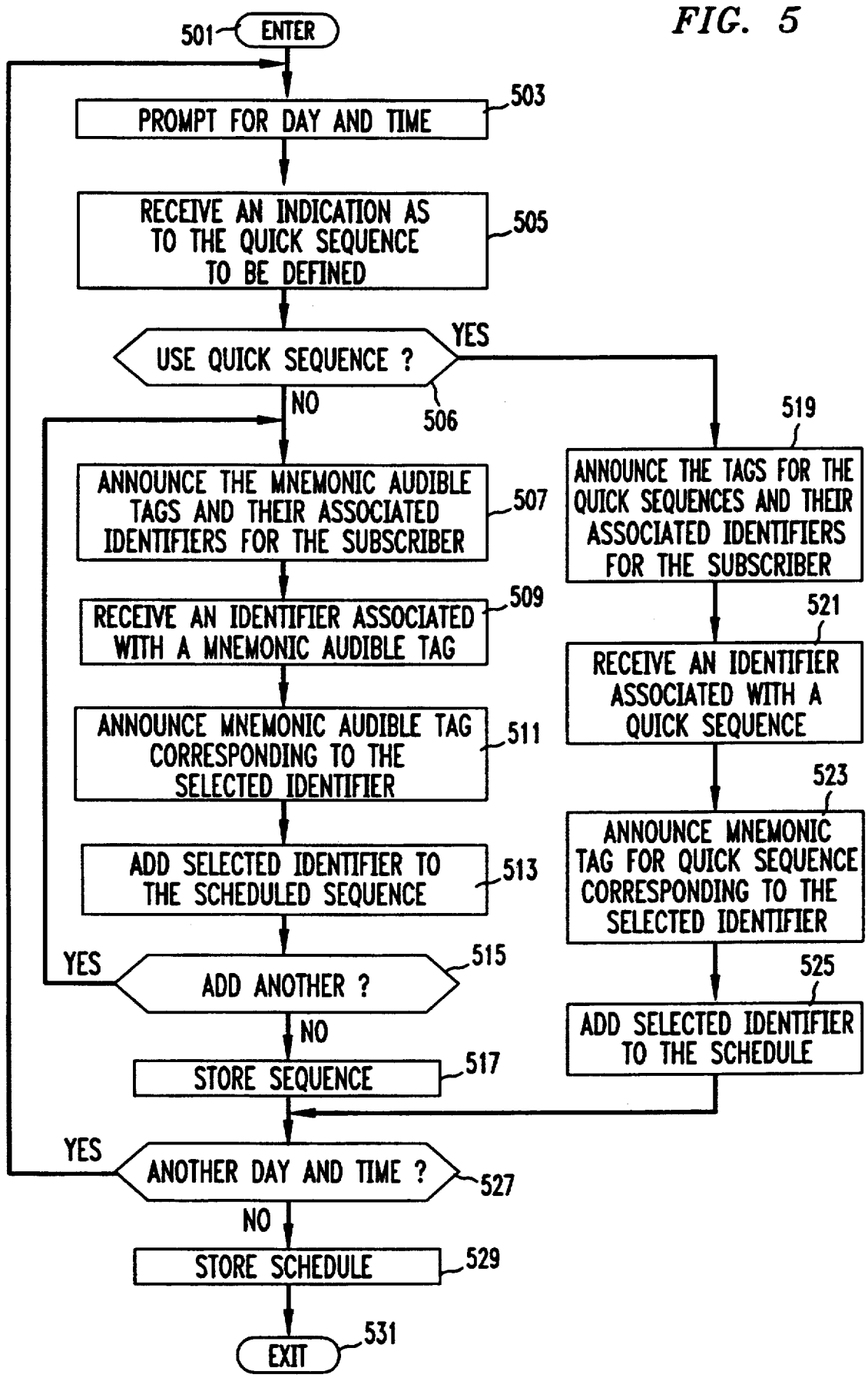
FIG. 5 shows an exemplary process for using the stored association between a mnemonic audible tags and telephone numbers to create a scheduled sequence of locations to which the calls to a subscriber's personal telephone number should be routed at a particular time, in accordance with the principles of the invention.

FIG. 5 shows an exemplary process for using the stored association between a mnemonic audible tags and telephone numbers to create a scheduled sequence of locations to which the calls to a subscriber's personal telephone number are routed at a particular time, in accordance with the principles of the invention. The sequence of destinations used at any particular time may be one of the stored "quick sequences" or it may be a sequence entered only for use at the particular time by using tags. Each of a subscriber's scheduled sequences has an associated day and time at which it will become the current sequence. A scheduled sequence that becomes the current sequence will remain the current sequence until the time of activation of another scheduled sequence unless the subscriber calls in and makes another sequence the current sequence, thereby overriding the scheduled sequence.

The process is entered in step 501 when the person to be located indicates that he wishes to define a scheduled sequence. In step 503, the subscriber is prompted to supply a day and time at which the sequence to be next scheduled is to become the current sequence. Next, in step 505, application adjunct 131 receives a signal indicating the day and time. Conditional branch point 506 tests to determine if the sequence of locations to be scheduled is one of the quick sequences. This step is performed by prompting the subscriber if he wishes to use a quick sequence and determining the subscriber's response. If the test result in step 506 is NO, control passes to steps 507,509,511,513,515, and 517 which are the same as steps 307,309,311,313,315, and 317 except that the identifiers are stored in the schedule at the indicated day and time rather than in a quick sequence. For brevity, the description of these steps will not be repeated.

If the test result in step 506 is YES, control passes to step 519, in which the mnemonic audible tags for the quick sequences and their corresponding identifiers are announced to the subscriber, in accordance with the principles of the invention. Alternatively, the mnemonic audible tags that indicate the telephone numbers represented in the quick sequences are announced to the subscriber, in accordance with an aspect of the invention. An identifier corresponding to a quick sequence is received from the subscriber in step 521. In optional step 523, the mnemonic audible tag corresponding to the selected quick sequence is announced to the subscriber, in accordance with he principles of the invention, for confirmation purposes. The selected quick sequence is added to the schedule at the indicated day and time, in step 525.

After completion of steps 517 or 525, control passes to conditional branch point 527, which tests to determine if a sequence should be scheduled for another day and time. This step is performed by prompting the subscriber if he wishes to schedule another sequence and determining the subscriber's response. If the test result in step 527 YES, control passes back to step 503, to schedule another sequence. If the test result in step 527 is NO, control passes to step 529, in which the schedule is stored. The process is then exited in step 531.

Table 4 shows an exemplary schedule, in which, for each scheduled time, calls to a subscribers personal telephone number will be attempted to be completed to up to 3 locations. Each scheduled time begins on a new line with a schedule designator, SC1, SC2, etc. The time of activation of a line is determined by the values in the Day and Time fields for the line. The identifiers of telephone numbers to which calls will attempted to be routed at each scheduled time are stored in the TAG-1-TAG3 fields. If a quick sequence is to be used, its designation, e.g., QS1, QS2, etc., is stored in the TAG 1 field.

TABLE 4

| Routing | Scheduler Sequence Routings | | | Terminating | Day | Time |
|---|---|---|---|---|---|---|
| | Tag 1 | Tag 2 | Tag 3 | | | |
| SC1 | QS1 | | | 07 | M | 08:00 |
| SC2 | QS3 | | | 07 | M | 13:00 |
| SC3 | 04 | 02 | 01 | 07 | F | 19:00 |
| SC4 | 01 | 02 | | 08 | S | 10:30 |

As an option, an additional, default location could be specified so that any uncompleted calls are routed to that location. Such default location, known as a "terminating location", should be a location to which the call can always be completed, such as a voice messaging service. The terminating location may be specified globally, i.e., always the same for each quick sequence or current destination. This is shown by the Terminating field of Table 4. Alternatively, the terminating location may be an additional location specifiable as part of a quick sequence, but it must be selected from a subset of available locations. Furthermore, the terminating location may be selected from a choice of locations by the subscriber or it may be predetermined by the personal communication service provider.

It is noted that, in other embodiments, a date could optionally be specified for a scheduled sequence.

Figure 4:
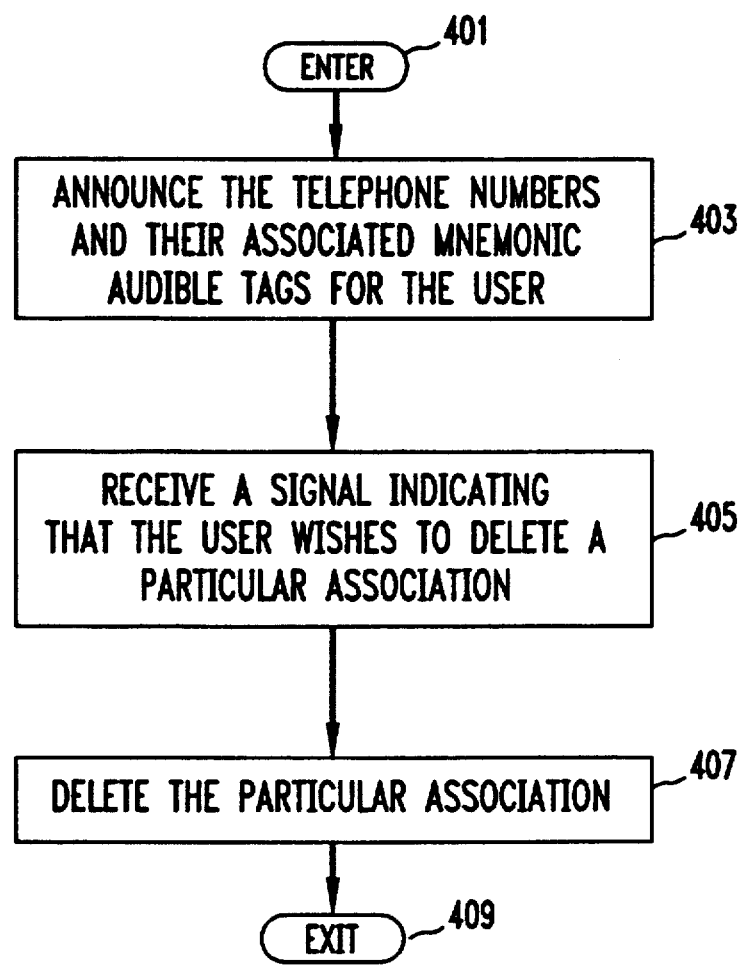
FIG. 4 shows an exemplary process for use in deleting the association between a telephone number, a mnemonic audible tag and its corresponding identifier.

FIG. 4 shows an exemplary process for use in deleting the association between a telephone number, a mnemonic audible tag and its corresponding identifier. The process is entered in step 401. Next, in step 403, the mnemonic audible tags and corresponding identifiers for which there are currently stored associated telephone numbers, as well as those associated telephone numbers, are announced to the subscriber. In step 405, a signal is received from the subscriber indicating the identifier corresponding to the mnemonic audible tag of the particular association he wishes to delete and, in step 407, the association is deleted. Deletion may be accomplished by clearing the value of the telephone number stored in table 2 for the received identifier. The process then exits in step 409.

Listings 4, 5 and 6, in the same format as listings 1, 2 and 3, show interactions between a hypothetical subscriber and an automated attendant system that facilitates the administration of personal telephone numbers according to an alternative embodiment of the invention. In this embodiment, the subscriber need not enter an identifier to indicate his selected tag, as in listing 1, 2 and 3 but, instead, he supplies a signal within a predetermined time of his beginning to hear the desired tag being spoken to indicate that he wishes to select it. The signal to be supplied in the embodiment shown in listings 4, 5 and 6 is a particular digit. In further alternative embodiments (not shown), the signal could be a) the receipt of the first digit of the telephone number to be associated with the tag, b) receipt of a signal indicating the pressing of a key other than a digit, or c) a verbal input.

Listing 4—Associating a telephone number to a tag
To manage your call screening PINs, press 1.
To manage your tags, press 2.
To manage your quick sequences, press 3.

subscriber presses 2.

To choose a new tag press 1, to delete a tag press 2, to hear your existing tags press 3.

subscriber presses 1.

Enter the tag code from your user guide, or enter 0 to hear the list of tags.

subscriber presses 0.

Tag 1 is home, telephone number is 555-999-2222.

To select this tag and to enter a new telephone number, press 1.
To hear the next tag press 0.
To quit what you are doing and return to the main menu press *R.

subscriber presses 0.

Tag 2 is office, telephone number is 555-888-4444

To select this tag and to enter a new telephone number, press 1.
To hear the next tag press 0.
To quit what you are doing and return to the main menu press *R.

subscriber presses 0.

Tag 3 is secretary.

To select this tag press 1.
To hear the next tag press 0.
To quit what you are doing and return to the main menu press *R.

subscriber presses 0.

Tag 4 is car phone.

To select this tag press 1.
To hear the next tag press 0.
To quit what you are doing and return to the main menu press *R.

subscriber presses 1.

Please enter a 10 digit telephone number, that is, enter the area code plus the number.

subscriber enters 5557773333

Tag 4 is car phone, telephone number is 555-777-3333.
To approve this tag press 1.
To approve this tag and add another press 2.
To redo this tag press 3.
To quit what you are doing and return to the main menu press *R.

subscriber presses 2.

Enter the tag code from your user guide, or enter 0 to hear the list of tags.

subscriber presses 0.

Tag 1 is home, telephone number is 555-999-2222

To select this tag and to enter a new telephone number, press 1.

To hear the next tag press 0.
To quit what you are doing and return to the main menu press *R.

subscriber presses 0.

Tag 2 is office, telephone number is 555-888-4444

To select this tag and to enter a new telephone number, press 1.
To hear the next tag press 0.
To quit what you are doing and return to the main menu press *R.

subscriber presses 1.

Please enter a 10 digit telephone number, that is, enter the area code plus the number.

subscriber enters 5556664444

Tag 2 is office, telephone number is 555-666-4444.
To approve this tag press 1.
To approve this tag and add another press 2.
To redo this tag press 3.

subscriber presses 1. (returns subscriber to main menu)
Listing 5—Storing tags in a quick sequence
To manage your call sceening PINs, press 1.
To manage your tags, press 2.
To manage your quick sequences, press 3.

subscriber presses 3.

To add a quick sequence, press 1.
To delete a quick sequence, press 2.
To bear your quick sequences, press 3.

subscriber presses 1.

Enter the quick sequence number. Please enter a number from one to nine.

subscriber presses 8. (the quick sequence will be stored as quick sequence number 8).

Where is the first place calls should be delivered?(the following listed items are those tags that have a phone number associated with them. Tags without a phone number are not listed).
Home, press 1 now.
Office, press 1 now.
Car Phone, press 1 now.

subscriber presses 1. (Car Phone becomes the first destination in the quick sequence)

Where is the second place calls should be delivered?

Home, press 1 now.
Office press 1, now.

subscriber presses 1. (Office becomes the second destination in the quick sequence)

Where is the third place calls should be delivered?

subscriber presses #. (Ends the quick sequence)

In quick sequence 8 calls go to Car Phone and then to Office.

To approve this quick sequence press 1.
To approve this quick sequence and add another press 2.
To redo this quick sequence press 3.
To quit what you are doing and return to the main menu press *R.

subscriber presses 1. (returns to the main menu)
Listing 6—Activating a quick sequence To get voice mall, press 1
To turn a quick sequence or quick follow me destination on or off, press 2
To change your call delivery schedules, press 3
To adminster your lists and system settings, press 4
To hear where your calls are going, press 5
To get help, press *H subscriber presses 2.

Enter the quick sequence number or enter 0 to hear your list of quick sequences. To use quick follow me press #.

subscriber presses 8.

Starting immediately your calls will be delivered to Car Phone and then to Office. This quick sequence will stay in effect until you turn it off.
To accept this quick sequence, press 1. Otherwise press 0.

subscriber presses 1.

Thank you.

Personal telephone numbers have certain unique characteristics that allow them to be differentiated from conventional telephone numbers. For example, they may have a unique area code, and, with that area code, they may be further divided by unique exchange numbers that indicate the interexchange carrier (IXC) that will carry calls directed to the number. When a call is placed to a personal telephone number, e.g., by a calling party originating a call at a telephone station 101 (FIG. 1), a switch of local exchange carrier (LEC) 103 receives the dialed digits and, from their unique characteristics, recognizes that the call is an IXC personal communications type of call. Therefore, local exchange carrier (LEC) 103 will route the call over a trunk, e.g., trunk 104, to switch 105 of an interexchange carrier for further handling. IXC switch 105 recognizes that the call is one to a personal telephone number and, accordingly, queries application adjunct 131, via directory services network interface 115 and communications interface 137, as to the course of action to be taken. The query includes an indication of the personal telephone number to which the call was placed. Application adjunct 131 determines the active sequence to which calls to the personal telephone number should currently be routed. The current sequence may have been made active via the passage of a time listed in a schedule or by the activation by the subscriber of a quick sequence. Application adjunct 131 supplies the stored telephone numbers corresponding to the active sequence to IXC switch 105, which attempts to complete the call to each supplied telephone number in the order of the sequence until the call is completed or abandoned by the caller.

The foregoing merely illustrates the principles of the invention. It will thus be appreciated that those skilled in the art will be able to devise various arrangements which, although not explicitly described or shown herein, embody the principles of the invention and are thus within its spirit and scope.

We claim:

1. A method for use in a telephone network for defining the destinations to which said telephone network attempts to complete telephone calls placed to a subscriber's telephone number, the method comprising the steps of:
   a. storing a plurality of pre-defined mnemonic audible tags for association with telephone numbers prior to any interactions with said subscriber,
   b. offering a choice of said pre-defined mnemonic audible tags by speaking them;
   c. receiving an indication of the one of said mnemonic audible tags selected by said subscriber;
   d. receiving signals indicating a telephone number supplied by said subscriber; and
   e. storing said received telephone number information in association with said selected mnemonic audible tag.

2. The invention as defined in claim 1 wherein said indication is an identifier corresponding to said selected mnemonic audible tag.

3. The invention as defined in claim 1 wherein said indication is a signal received within a predetermined time after the start of the speaking of a mnemonic audible tag.

4. The invention as defined in claim 1 wherein said mnemonic audible tags each have a respective corresponding identifier and wherein, in said last mentioned storing step, said association is created between said selected mnemonic audible tag, its corresponding identifier and said received telephone number.

5. The invention as defined in claim 4 wherein said identifiers are indicated by signals generated in response to said subscriber pressing keys on a telephone dial pad.

6. The invention as defined in claim 1 wherein steps (b) through (e) are repeated at least once so that there is information stored creating associations between at least two mnemonic audible tags of said plurality and their respective received telephone numbers, and wherein said method further includes the steps of:
   offering said subscriber a choice of said at least two mnemonic audible tags by speaking them;
   making a determination of the one of said at least two mnemonic audible tags picked by said subscriber; and
   adding said picked one of said mnemonic audible tags to an ordered set of destinations to which said telephone network attempts to complete telephone calls placed to said subscriber's telephone number.

7. The invention as defined in claim 6 further including the step of:
   offering a choice of pre-defined mnemonic audible tags from a second plurality by speaking them;
   making a determination of the one of said mnemonic audible tags of said second plurality that is selected by said subscriber; and
   storing information that creates an association between said selected mnemonic audible tag of said second plurality and said ordered set.

8. The invention as defined in claim 7 wherein said mnemonic audible tags of said second plurality each have a respective corresponding identifier and wherein, in said storing step that creates said association between said selected mnemonic audible tag of said second plurality and said ordered set, said association further includes said corresponding identifier of said selected mnemonic audible tag of said second plurality 9. The invention as defined in claim 8 wherein said identifiers corresponding to said mnemonic audible tags of said second plurality are indicated by signals generated in response to said subscriber pressing keys on a telephone dial pad.

10. A method for defining the destinations to which a telephone network attempts to complete telephone calls placed to a subscriber's telephone number, the method comprising the steps of:
    a. storing a plurality of pre-defined mnemonic audible tags for association with telephone numbers;
    b. providing an audible announcement offering a choice of said pre-defined mnemonic audible tags;
    c. responsive to selection of one of said mnemonic audible tags by said subscriber, receiving signals indicating a telephone number supplied by said subscriber; and
    d. storing said number and information to create an association between said selected mnemonic audible tag and said received telephone number.

11. A method for use in creating a sequence of locations to which calls to a subscriber's number are directed, comprising the steps of:
    storing a plurality of pre-defined mnemonic audible tags, each for association with a plurality of telephone numbers;
    storing, for said subscriber, (i) telephone numbers supplied by said subscriber each indicating a location and (ii) information creating associations between respective ones of said supplied telephone numbers and respective particular ones of said pre-defined mnemonic audible tags selected by said subscriber in response to an announcement of said selected particular ones of said pre-defined mnemonic audible tags; and
    storing information indicating said sequence of locations in response to signals from said subscriber indicating said subscriber's choosing of at least two of said ones of said particular pre-defined mnemonic audible tags, said selected choosing is performed after at least two of said associations are created in response to an announcement to said subscriber of at least one of said selected particular pre-defined mnemonic audible tags.

12. The invention as defined in claim 11 wherein no more than one telephone number is stored for each one of said pre-defined mnemonic audible tags per subscriber at any particular time.

13. A method for use in determining a current ordered set of destinations to which calls to a subscriber's personal telephone number are routed, the method comprising the steps of:
    storing information associating a received telephone number with a pre-defined mnemonic audible tag;
    forming an ordered set of destinations by (i) speaking at least one of said mnemonic audible tags for which said association information is stored, (ii) receiving an indication of a selection of at least one of said spoken mnemonic audible tags, and (iii)

adding said selected at least one of said tags to said ordered set.

14. The invention as defined in claim 13 further including the step of indicating that said ordered set is said current ordered set.

15. The invention as defined in claim 13 wherein said telephone number and said selections are indicated by receipt of dual tone multi-frequency signals.

16. The invention as defined in claim 13 further wherein said adding is performed so that said ordered set is ordered in the same order as said tags are selected.

* * * * *